(12) United States Patent
Lee et al.

(10) Patent No.: US 10,601,013 B2
(45) Date of Patent: Mar. 24, 2020

(54) COMPOSITE FILM AND MANUFACTURING METHOD FOR THE SAME AND BATTERY COMPRISING COMPOSITE FILM

(71) Applicant: INDUSTRIAL TECHNOLOGY RESEARCH INSTITUTE, Hsinchu (TW)

(72) Inventors: Chih-Hung Lee, Taipei (TW); Ang-Ta Tsai, Taichung (TW); Yen-Cheng Li, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 223 days.

(21) Appl. No.: 15/853,245

(22) Filed: Dec. 22, 2017

(65) Prior Publication Data
US 2019/0067661 A1    Feb. 28, 2019

(30) Foreign Application Priority Data
Aug. 31, 2017 (TW) .............................. 106129709 A

(51) Int. Cl.
*H01M 2/16* (2006.01)
*H01M 2/14* (2006.01)
(Continued)

(52) U.S. Cl.
CPC ......... *H01M 2/1686* (2013.01); *H01M 2/145* (2013.01); *H01M 2/1653* (2013.01);
(Continued)

(58) Field of Classification Search
CPC .. H01M 2/1686; H01M 2/145; H01M 2/1653; H01M 10/0525; H01M 10/052;
(Continued)

(56) References Cited

U.S. PATENT DOCUMENTS 8,349,957 B2    1/2013 Abe et al.
8,801,984 B2    8/2014 Rhee et al.
(Continued)

FOREIGN PATENT DOCUMENTS

CN    101044019 A    9/2007
CN    103153571 A    6/2013

OTHER PUBLICATIONS

Tabatabaei et al., "Microporous membranes obtained from PP/HDPE multilayer films by stretching", Journal of Membrane Science, vol. 345, 2009, pp. 148-159.

*Primary Examiner* — Helen Oi K Conley
(74) *Attorney, Agent, or Firm* — Birch, Stewart, Kolasch & Birch, LLP

(57) ABSTRACT

A composite film, a manufacturing method for the same, and a battery comprising the composite film are provided. The composite film includes a first layer and a second layer on a side of the first layer. The first layer includes a first polyolefin. The first polyolefin has an orientation function of at least 0.6. The first polyolefin has a repeating unit of

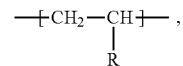

wherein R is an alkyl group having 2, 3, 4, or 5 carbon atoms. The second layer includes a second polyolefin. The second polyolefin has an orientation function of at least 0.5. The second polyolefin has a repeating unit of

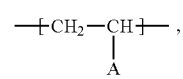

wherein A is a hydrogen or a methyl group.

14 Claims, 1 Drawing Sheet

(51) Int. Cl.
*H01M 10/0525* (2010.01)
*B29L 31/34* (2006.01)
*B29C 71/02* (2006.01)
*B29K 23/00* (2006.01)
*B29C 48/08* (2019.01)
*B29C 48/00* (2019.01)
*B29C 48/21* (2019.01)
*B29C 48/88* (2019.01)
*H01M 10/052* (2010.01)

(52) U.S. Cl.
CPC ..... *H01M 10/0525* (2013.01); *B29C 48/0018* (2019.02); *B29C 48/08* (2019.02); *B29C 48/21* (2019.02); *B29C 48/914* (2019.02); *B29C 71/02* (2013.01); *B29C 2071/022* (2013.01); *B29K 2023/12* (2013.01); *B29L 2031/3468* (2013.01); *H01M 10/052* (2013.01)

(58) Field of Classification Search
CPC ....... B29C 48/915; B29C 48/08; B29C 48/21; B29C 48/0018; B29C 71/02; B29C 2071/022; B29K 2023/12; B29L 2031/3468
See application file for complete search history.

(56) References Cited

U.S. PATENT DOCUMENTS

| | | |
|---|---|---|
| 9,136,517 B2 | 9/2015 | Ishihara et al. |
| 2009/0117453 A1 | 5/2009 | Kikuchi et al. |
| 2014/0295061 A1 | 10/2014 | Lee et al. |
| 2015/0214528 A1 | 7/2015 | Sano et al. |

COMPOSITE FILM AND MANUFACTURING METHOD FOR THE SAME AND BATTERY COMPRISING COMPOSITE FILM

This application claims the benefit of Taiwan application Serial No. 106129709, filed Aug. 31, 2017, the subject matter of which is incorporated herein by reference.

TECHNICAL FIELD

The disclosure relates in general to a composite film and a manufacturing method for the same, and more particularly to a composite film used in a battery.

BACKGROUND

Lithium battery has been widely used in portable electronic products. Along with the development of electric vehicles, the need of relevant materials has attracted people's attention. Lithium battery has the advantage of high energy density, and complies with the requirement of power lithium battery for electric vehicles. However, due to the large power output and size increase of the battery, a large volume of heat will be generated during the operation. Without an effective protection mechanism, thermal runaway may easily occur and cause the battery to burn and explore. Thus, the separator is very crucial to the safety of lithium battery. The separator is disposed between two electrodes for conducting the ions to trigger electrochemical reaction. Thus, the separator needs to have excellent ion conductivity and possess sufficient mechanic strength and penetration resistance to avoid the lithium dendrite during electrochemical reaction penetrating the separator and causing short-circuiting. When temperature arises abnormally, the thermal closed-pore feature of the separator will block ion conduction and terminate electrochemical reaction to avoid the heat being released continuously.

SUMMARY

According to an embodiment, a composite film is provided. The composite film comprises a first layer and a second layer on a side of the first layer. The first layer comprises a first polyolefin. The first polyolefin has an orientation function of at least 0.6. The first polyolefin has a repeating unit of

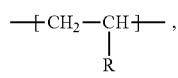

wherein R is an alkyl group having 2, 3, 4, or 5 carbon atoms. The second layer comprises a second polyolefin. The second polyolefin has an orientation function of at least 0.5. The second polyolefin has a repeating unit of

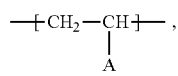

wherein A is a hydrogen or a methyl group.

According to an embodiment, a manufacturing method for composite film is provided. The manufacturing method comprises following steps. A co-extrusion process is performed to a first polyolefin and a second polyolefin to form the composite film comprising a first layer and a second layer. The first layer comprises a first polyolefin. The second layer is on a side of the first layer and comprises a second polyolefin. The first polyolefin has an orientation function of at least 0.6. The first polyolefin has a repeating unit of

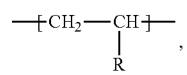

wherein R is an alkyl group having 2, 3, 4, or 5 carbon atoms. The second polyolefin has an orientation function of at least 0.5. The second polyolefin has a repeating unit of

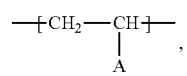

wherein A is a hydrogen or a methyl group.

According to another embodiment, a battery comprising a composite film is provided. The composite film comprises a first layer and a second layer on a side of the first layer. The first layer comprises a first polyolefin. The first polyolefin has an orientation function of at least 0.6. The first polyolefin has a repeating unit of

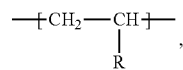

wherein R is an alkyl group having 2, 3, 4, or 5 carbon atoms. The second layer comprises a second polyolefin. The second polyolefin has an orientation function of at least 0.5. The second polyolefin has a repeating unit of

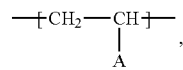

wherein A is a hydrogen or a methyl group. The manufacturing method for the composite film comprises performing a co-extrusion process to the first polyolefin and the second polyolefin.

The above and other aspects of the disclosure will become better understood with regard to the following detailed description of the preferred but non-limiting embodiment(s). The following description is made with reference to the accompanying drawings.

DETAILED DESCRIPTION

A composite film according to an embodiment of the present disclosure is provided. The composite film has low impedance. When the composite film is used as a separator in a lithium battery, the transfer impedance of lithium ions can be reduced and the reaction efficiency of the lithium battery can be increased.

It should be noted that although the present disclosure does not illustrate all possible embodiments, other embodiments not disclosed in the present disclosure are still applicable. Moreover, the dimension scales used in the accompanying drawings are not based on actual proportion of the product. Therefore, the specification and drawings are for explaining and describing the embodiment only, not for limiting the scope of protection of the present disclosure. Furthermore, descriptions of the embodiments, such as detailed structures, manufacturing procedures and materials, are for exemplification purpose only, not for limiting the scope of protection of the present disclosure. Suitable modifications or changes can be made to the structures and procedures of the embodiments to meet actual needs without breaching the spirit of the present disclosure. Designations common to the accompanying drawings are used to indicate identical or similar elements.

Figure 1:
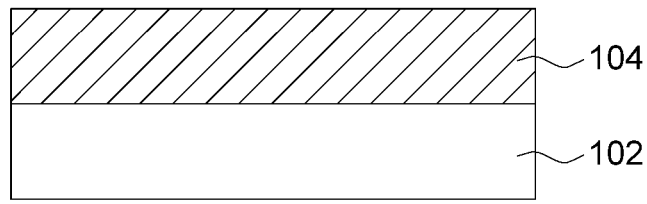
FIG. 1 is a cross-sectional view of a composite film according to an embodiment of the present disclosure.

FIG. 1 is a cross-sectional view of a composite film 100 according to an embodiment of the present disclosure. The composite film 100 comprises a first layer 102 and a second layer 104 on a side of the first layer 102. In an embodiment, the first layer 102 may comprise a first polyolefin, and the second layer 104 may comprise a second polyolefin. In an embodiment, the first layer 102 may comprise a first polyolefin, and the second layer 104 may comprise a second polyolefin different from the first polyolefin. In an embodiment, the first layer 102 can be formed of the first polyolefin, and the second layer 104 can be formed of the second polyolefin different from the first polyolefin. In an embodiment, the first layer 102 and the second layer 104 can be adjacent to each other.

In an embodiment, the first polyolefin has an orientation function of at least 0.6, such as within a range of 0.6~0.95, 0.6~0.9, 0.7~0.95, 0.7~0.9, or 0.8~0.9.

In an embodiment, the first polyolefin has a repeating unit of

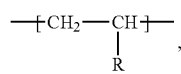

the number of the repeating unit is within a range of 100~2200, such as 100~1500, 100~1000, 100~500, or 100~250, wherein R is an alkyl group having 2, 3, 4, or 5 carbon atoms. The first polyolefin can be formed by a material selected from polymethylpentene (PMP), polybutene and a combination thereof. In an embodiment, the first layer 102 can be formed of PMP. That is, the first polyolefin can be PMP. In an embodiment, PMP can be poly(4-methyl-1-pentene) whose chemical formula can be expressed as:

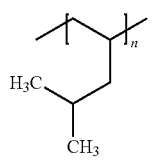

n is an integer within a range of 100 to 2200, such as 100 to 1500, 100 to 1000, 100 to 500, 100 to 250, 220 to 2200, 220 to 1500, 220 to 1000, 220 to 500, 220 to 250, or 500 to 600.

In an embodiment, the second polyolefin has an orientation function of at least 0.5, such as within a range of 0.5 to 0.9, 0.55 to 0.9, or 0.55 to 0.85.

In an embodiment, the second polyolefin has a repeating unit of

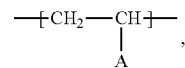

wherein A is a hydrogen or a methyl group. In an embodiment, the second polyolefin can be formed of a material selected from polyethylene (PE), polypropylene (PP), and a combination thereof.

In an embodiment, the melting temperature (Tm) of the first layer 102 (or the first polyolefin) can be different from the melting temperature of the second layer 104 (or the second polyolefin). For example, the melting temperature of the first polyolefin differs with the melting temperature of the second polyolefin by at least 55° C. The material with a high melting temperature provides high temperature stability. The material with a low melting temperature provides the function of closed-pore at a low temperature. The larger the difference in the melting temperature, the safer the use of the composite film 100 in the lithium battery. When the temperature of the lithium battery increases abnormally, the material with a low melting temperature can quickly activate the closed-pore mechanism to block the ions, and the material with a high melting temperature can continuously separate the two electrodes during temperature increase. Thus, the two electrodes will not come into contact and become internal short-circuited. For example, the first polyolefin has a melting temperature within a range of 220 to 240° C., and the second polyolefin has a melting temperature within a range of 130 to 165° C.

In an embodiment, the melting flow index of the first polyolefin can be different from the melting flow index of the second polyolefin. For example, the first polyolefin has a melting flow index of 4 g/10 min to 30 g/10 min or 7 g/10 min to 21 g/10 min; the second polyolefin has a melting flow index of 0.2 g/10 min to 6 g/10 min or 0.4 g/10 min to 3 g/10 min.

Figure 2:
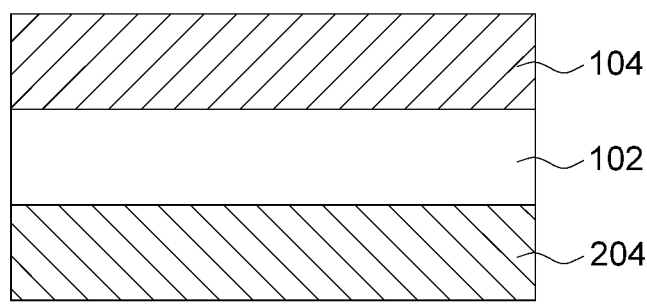
FIG. 2 is a cross-sectional view of a composite film according to another embodiment of the present disclosure.

FIG. 2 is a cross-sectional view of a composite film 200 according to another embodiment of the present disclosure. The composite film 200 of FIG. 2 is different from the composite film 100 of FIG. 1 mainly in that the composite film 200 comprises a third layer 204 on a side of the first layer 102 opposite to the second layer 104. In an embodiment, the third layer 204 and the first layer 102 can be adjacent to each other.

The third layer 204 comprises a third polyolefin different from the first polyolefin. In an embodiment, the second layer 104 and the third layer 204 can be formed of the same polyolefin, that is, the second polyolefin and the third polyolefin can be the same. In other embodiments, the second layer 104 and the third layer 204 can be formed of different kinds of polyolefin, that is, the second polyolefin and the third polyolefin can be different.

In an embodiment, the third polyolefin has an orientation function of at least 0.5, such as within a range of 0.5 to 0.9, 0.55 to 0.9, or 0.55 to 0.85.

In an embodiment, the third polyolefin has a repeating unit of

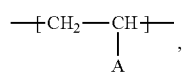

wherein A is a hydrogen or a methyl group. In an embodiment, the third polyolefin can be formed of a material selected from a group composed of PE, PP, and a combination thereof.

In an embodiment, the melting temperature (Tm) of the first polyolefin can be different from the melting temperature of the third polyolefin. For example, the melting temperature of the first polyolefin differs with the melting temperature of the third polyolefin by at least 55° C. For example, the first polyolefin has a melting temperature within a range of 220 to 240° C., and the third polyolefin has a melting temperature within a range of 130 to 165° C.

In an embodiment, the melting flow index of the first polyolefin can be different from the melting flow index of the third polyolefin. For example, the first polyolefin has a melting flow index of 4 g/10 min to 30 g/10 min or 7 g/10 min to 21 g/10 min; the third polyolefin has a melting flow index of 0.2 g/10 min to 6 g/10 min or 0.4 g/10 min to 3 g/10 min.

In an embodiment, the composite film 100 is composed of the first layer 102 and the second layer 104 which are formed by a co-extrusion process. The composite film 200 is composed of the first layer 102, the second layer 104 and the third layer 204 which are formed by a co-extrusion process. In an embodiment, the composite film 100 is composed of the first polyolefin and the second polyolefin which are formed by a co-extrusion process; the composite film 200 is composed of the first polyolefin, the second polyolefin and the third polyolefin which are formed by a co-extrusion process. In an embodiment, the co-extrusion process has a temperature within a range of 190 to 300° C. or 210 to 280° C., a cooling wheel temperature within a range of 15 to 40° C. or 20 to 35° C., and a cooling wheel speed within a range of 8 m/min to 20 m/min, such as 10 m/min to 20 m/min or 1 m/min to 15 m/min. The cooling wheel can draw the polymer fluid coming off the mold, such that the polymer segments in the fluid, which are originally in the state of curled segments, can be stretched as linear chains. Meanwhile, the cooling effect makes the polymer of linear chains crystalize at a low temperature and achieve a high orientation function. Generally speaking, it is very difficult to form a composite film by a co-extrusion process if the materials of the composite film have large difference in terms of melting temperature. According to a special parameter design of the co-extrusion process, the composite film 100 (the composite film 200) comprising the first layer 102 and the second layer 104 (and the third layer 204) can be obtained, and both the first polyolefin of the first layer 102 and the second polyolefin (and/or the third polyolefin) of the second layer 104 (and/or the third layer 204) have a specific orientation function.

Following the cooling step, an annealing step can be performed, wherein the annealing temperature is within a range of 100 to 180° C. or 120 to 170° C., and the annealing time is within a range of 10 min to 3 hours.

In an embodiment, a pore forming-extending process can be performed to form pores on the composite film 100 or the composite film 200 such that the composite film 100 or the composite film 200 can become a porous composite film, wherein the composite film has a porosity within a range of 36% to 42% (the testing method is ASTMD2873). The pore forming-extending process can be a dry extension process.

It should be noted that when the first polyolefin of the first layer 102 has a specific orientation function and the second polyolefin of the second layer 104 (and/or the third polyolefin of the third layer 204) also has a specific orientation function, the composite film 100 (or the composite film 200) with a specific porosity can be obtained by the pore forming-extending process and the required impedance can be achieved accordingly. Specifically, the separator of the lithium battery separates the positive electrode from the negative electrode and transfers ions, and the lower the impedance, the easier the transfer of ions, and the better the efficiency of the battery. According to the dry extension pore forming process, the interface between the crystal area and the amorphous area of the polymer are broken to form pores by way of extension. The key to achieving high porosity lies in the control of the orientation function. When the crystals are arranged in a direction consistent with the extension direction, the pore forming efficiency will be the best and the manufactured porous film will have the lowest impedance. That is, high orientation function is crucial to the formation of the film with high porosity and is necessary to the formation of the separator with low impedance.

In an embodiment, the composite film 100 or the composite film 200 has a low impedance within a range of 15Ω to 50Ω, and therefore can be used in various electronic devices requiring a film with low impedance such as the battery. For example, the composite film 100 or the composite film 200 can be used as a separator of the lithium battery to enhance the efficiency of the battery. Of the separator, the first layer 102 can be used as a high temperature supporting layer, and the second layer 104 and the third layer 204 can be used as a thermal closed-pore layer.

For the object, technical features and advantages of the present disclosure to be more easily understood by anyone ordinary skilled in the technology field, a number of exemplary embodiments are disclosed below with detailed descriptions and accompanying drawings.

Example 1

The manufacturing method for a composite film formed of poly(4-methyl-1-pentene) (PMP) (TPX manufactured by the Mitsui Chemicals of Japan, n value is 500600) and polypropylene (PP) comprises following steps. Firstly, TPX resin beads and PP resin beads are inputted to different feed openings of a co-extruder, wherein TPX has a screw temperature set within a range of 240 to 260° C., PP has a screw temperature set within a range of 230~260° C., a die head temperature set within a range of 230 to 260° C., a throughput set within a range of 6 to 10 Kg/hr, a cooling wheel temperature set at 25° C., a cooling wheel speed set within a range of 10 m/min to 12 m/min, and a draw ratio controlled to be within a range of 20 to 30. Then, the extruded composite film is placed in an oven and annealed at a temperature within a range of 140 to 150° C. for 3 hours to obtain a PP/TPX composite film. Then, the composite film is drawn for 40% to 50% of its original length at a draw speed of 10 mm/min and an environment temperature within a range of 70 to 80° C. Then, the temperature is increased to 135 to 150° C. and the composite film is drawn for 50% to 60% of its original length. Then, the temperature is increased to 140 to 150° C. and the composite film is heat-set for 10 min to obtain a porous PP/TPX composite film having a thickness of about 20 μm and a porosity of about 39%. The orientation function of the composite film is measured (the measurement method can be obtained with reference to Journal of Membrane Science Volume 345, Issues 1-2, 1

Dec. 2009, Pages 148-159), and the impedance is measured by an electrochemical analyzer (CH Instruments, Inc., Model 760E). The measurements are illustrated in Table 1.

Example 2

The steps of example 2 are similar to that of example 1 except that the cooling wheel speed is adjusted to 11 m/min to 15 m/min to obtain different PP/TPX composite films with different PP/TPX orientation functions. The porous PP/TPX composite film has a thickness of about 20 μm. The orientation function and impedance of the composite film are measured, and the measurements are illustrated in Table 1.

Example 3

The steps of example 3 are similar to that of example 1 except that PP resin is inputted to the third feed opening of a co-extruder to obtain a PP/TPX/PP composite film. The porous composite film has a thickness of about 20 μm. Then, the orientation function and impedance of the composite film are measured, and the measurements are illustrated in Table 1.

Example 4

The manufacturing method for a composite film composed of TPX and polyethylene (PE) comprises following steps. Firstly, TPX resin beads and PE resin beads are inputted to different feed openings of a co-extruder, wherein TPX has a screw temperature set within a range of 240 to 260° C., PE has a screw temperature set within a range of 230 to 250° C., a die head temperature set within a range of 230 to 250° C., a throughput set within a range of 6 to 10 Kg/hr, a cooling wheel temperature set at 25° C., a cooling wheel speed set within a range of 11 m/min to 13 m/min, and a draw ratio controlled to be within a range of 20 to 30. Then, the extruded composite film is placed in an oven and annealed at a temperature within a range of 120 to 130° C. for 3 hours to obtain a PE/TPX/PE composite film. Then, the composite film is drawn for 40% to 50% of its original length at a draw speed of 10 mm/min and an environment temperature within a range of 55 to 70° C. Then, the temperature is increased to 110 to 125° C. and the composite film is drawn for 50% to 60% of its original length. Then, the temperature is increased to 120 to 125° C. and the composite film is heat-set for 10 min to obtain a porous PE/TPX/PE composite film. The orientation function and impedance of the composite film are measured, and the measurements are illustrated in Table 1.

Comparison Example 1

The steps of comparison example 1 are similar to that of example 1 except that cooling wheel speed is adjusted to 6 m/min to 9 m/min to obtain different PP/TPX composite films with different PP/TPX orientation functions. The porous PP/TPX composite film has a thickness of about 20 μm. Then, the orientation function the composite film and the impedance of the porous composite film are measured, and the measurements are illustrated in Table 1.

Measurements of various composite films are illustrated in Table 1.

TABLE 1

|  | Composite film | Orientation function | Impedance (Ω) |
| --- | --- | --- | --- |
| Example 1 | PP/TPX | 0.58/0.67 | 28 |
| Example 2 | PP/TPX | 0.61/0.82 | 18 |
| Example 3 | PP/TPX/PP | 0.56/0.64/0.56 | 33 |
| Example 4 | PE/TPX/PE | 0.85/0.71/0.85 | 35 |
| Comparison example 1 | PP/TPX | 0.50/0.54 | 84 |

Table 1 shows that in Example 1 to Example 4, the impedance of the composite film whose first polyolefin (TPX) has an orientation function larger than 0.6 or even 0.8, and second polyolefin and third polyolefin (PP or PE) have an orientation function larger than 0.5 or even 0.8, is lower than that of the PP/TPX composite film of comparison example 1 whose orientation function is smaller than 0.5/0.6.

While the disclosure has been described by way of example and in terms of the preferred embodiment (s), it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A composite film, comprising:
   a first layer comprising a first polyolefin having an orientation function of at least 0.6 and a repeating unit of

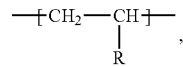

wherein R is an alkyl group having 2, 3, 4, or 5 carbon atoms; and
   a second layer on a side of the first layer and comprising a second polyolefin having an orientation function of at least 0.5 and a repeating unit of

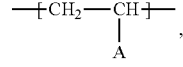

wherein A is a hydrogen or a methyl group.

2. The composite film according to claim 1, wherein a melting temperature (Tm) of the first polyolefin differs with a melting temperature of the second polyolefin by at least 55° C.

3. The composite film according to claim 1, wherein the first polyolefin has a melting temperature within a range of 220 to 240° C., and the second polyolefin has a melting temperature within a range of 130 to 165° C.

4. The composite film according to claim 1, wherein the first polyolefin has a melting flow index of 4 g/10 min to 30 g/10 min, the second polyolefin has a melting flow index of 0.2 g/10 min to 6 g/10 min.

5. The composite film according to claim 1, wherein the orientation function of the first polyolefin is 0.6 to 0.95.

6. The composite film according to claim 5, wherein a melting temperature of the first polyolefin differs with a melting temperature of the second polyolefin by at least 55° C.

7. The composite film according to claim 5, wherein the first polyolefin has a melting temperature within a range of 220 to 240° C., and the second polyolefin has a melting temperature within a range of 130 to 165° C.

8. The composite film according to claim 5, wherein the first polyolefin has a melting flow index of 4 g/10 min to 30 g/10 min, and the second polyolefin has a melting flow index of 0.2 g/10 min to 6 g/10 min.

9. The composite film according to claim 1, wherein the first layer is formed of a material selected from polymethylpentene, polybutene, and a combination thereof, and the second layer is formed of a material selected from polyethylene, polypropylene, and a combination thereof.

10. The composite film according to claim 1, further comprising a third layer on a side of the first layer opposite to the second layer and comprising a third polyolefin having an orientation function of at least 0.5 and a repeating unit of

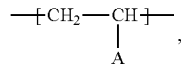, wherein A is a hydrogen or a methyl group.

11. A manufacturing method for composite film, comprising:

performing a co-extrusion process to a first polyolefin and a second polyolefin to form a composite film comprising a first layer and a second layer, wherein the first layer comprises the first polyolefin having an orientation function of at least 0.6 and a repeating unit of

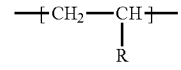

with R being an alkyl group having 2, 3, 4, or 5 carbon atoms, and the second layer is on a side of the first layer and comprises the second polyolefin having an orientation function of at least 0.5 and a repeating unit of

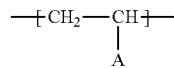

with A being a hydrogen or a methyl group.

12. The manufacturing method for composite film according to claim 11, further comprising performing a pore forming-extending process to the composite film.

13. The manufacturing method for composite film according to claim 11, wherein the co-extrusion process has a cooling wheel temperature within a range of 15 to 40° C. and a cooling wheel speed of 8 m/min to 20 m/min.

14. A battery, comprising the composite film according to claim 1 or is manufactured by the manufacturing method for composite film, comprising:

performing a co-extrusion process to a first polyolefin and a second polyolefin to form a composite film comprising a first layer and a second layer, wherein the first layer comprises the first polyolefin having an orientation function of at least 0.6 and a repeating unit of

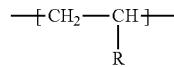

with R being an alkyl group having 2, 3, 4, or 5 carbon atoms, and the second layer is on a side of the first layer and comprises the second polyolefin having an orientation function of at least 0.5 and a repeating unit of

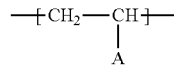

with A being a hydrogen or a methyl group.

* * * * *